United States Patent [19]

Raidel

[11] 3,751,063
[45] Aug. 7, 1973

[54] MULTIPLE JOINT TANDEM SUSPENSION WITH TORQUE SPRINGS
[75] Inventor: John E. Raidel, Springfield, Mo.
[73] Assignee: Ridewell Corporation, Springfield, Mo.
[22] Filed: Nov. 16, 1971
[21] Appl. No.: 199,150

[52] U.S. Cl............ 280/104.5 A, 280/80 B, 267/56
[51] Int. Cl............................................... B60g 5/04
[58] Field of Search.............. 280/104.5 A, 104.5 R, 280/80 B; 267/54 B, 55, 56

[56] References Cited
UNITED STATES PATENTS

| 2,226,100 | 12/1940 | Larison | 280/104.5 A |
| 2,655,388 | 10/1953 | Nabors | 280/104.5 R |
| 3,471,165 | 10/1969 | Raidel | 280/104.5 R |
| 3,510,149 | 5/1970 | Raidel | 267/56 |

Primary Examiner—Philip Goodman
Assistant Examiner—John A. Carroll
Attorney—Rogers, Ezell, Eilers & Robbins

[57] ABSTRACT

A tandem vehicle suspension having a compensator member pivotally supported on a transverse trunnion depending from a vehicle chassis, independent forwardly and rearwardly extending torque springs pivotally connected to the compensator at one end and to the forward and rearward axles, respectively, at their other ends, and bearing means between the compensator and torque springs, the respective pivotal connections and bearing means creating greater reactive forces and better load distribution between the two axles.

9 Claims, 7 Drawing Figures

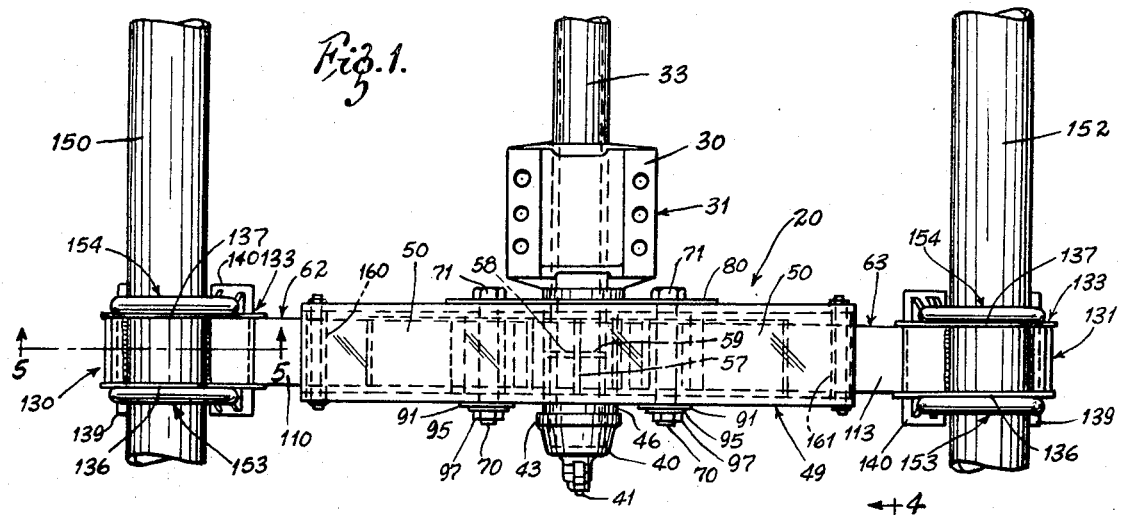
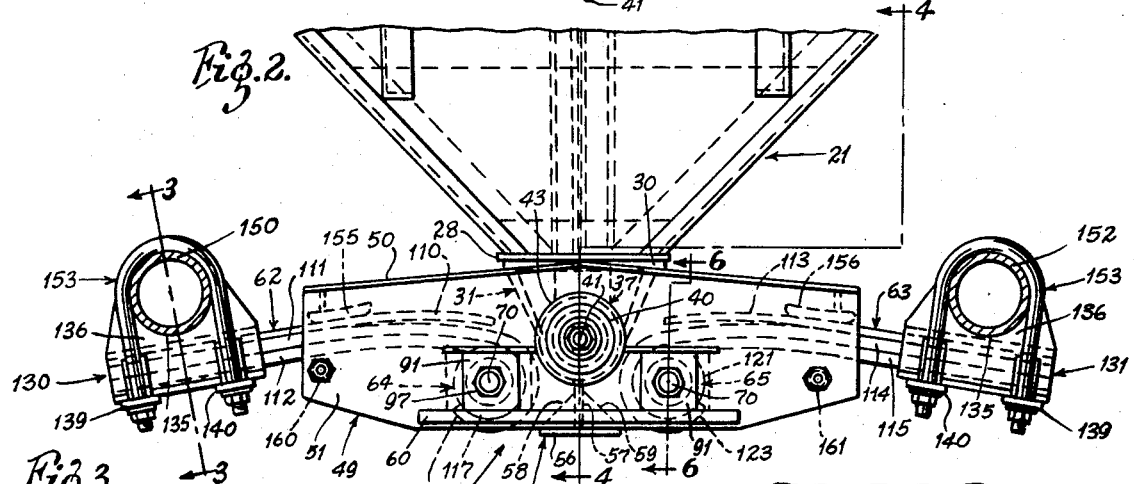
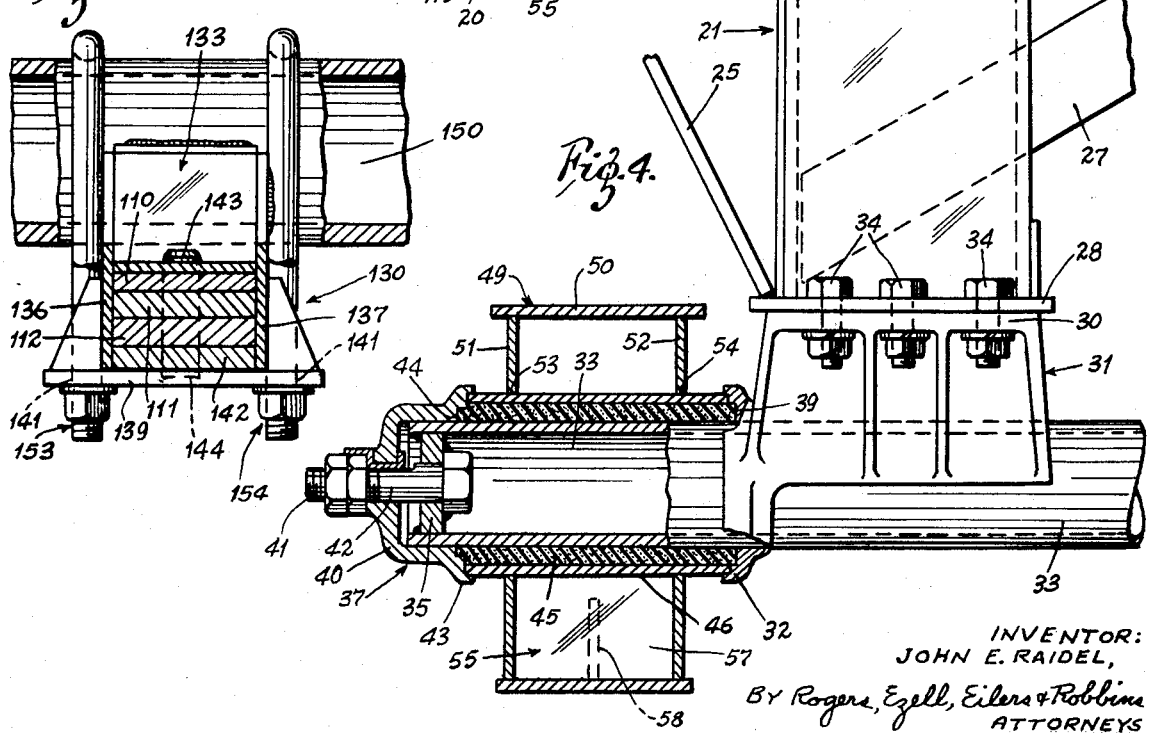

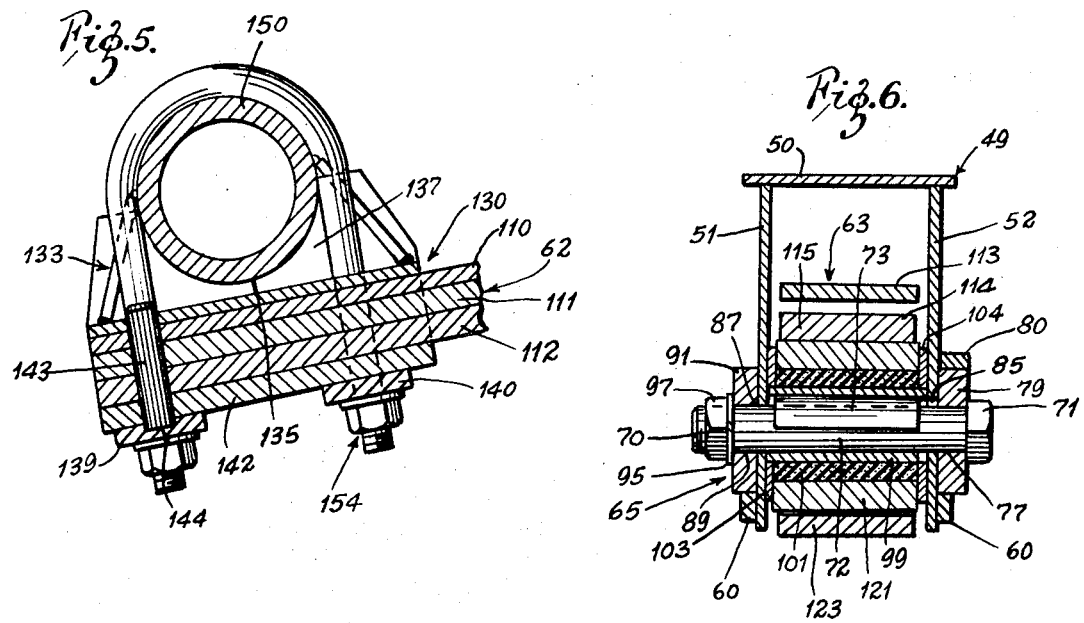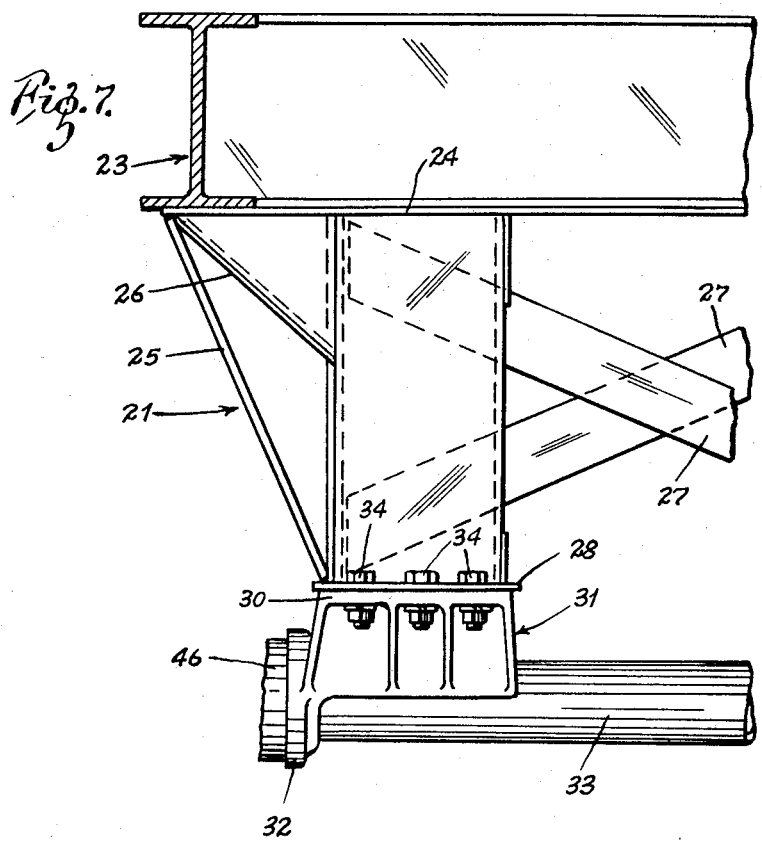

MULTIPLE JOINT TANDEM SUSPENSION WITH TORQUE SPRINGS

SUMMARY OF THE INVENTION

This invention relates to a tandem vehicle suspension assembly and particularly to an independent two-axle suspension with multiple joint and flexing torque springs. On each side of the vehicle body a pedestal is suspended from the chassis. A trunnion shaft is mounted between the pedestals, and a compensator in the form of an inverted U-shaped channel member is pivotally connected by a resilient bushing to each end of the trunnion shaft. Forwardly and rearwardly extending torque springs are pivotally connected by resilient bushings to the channel member and by clamp assemblies to the respective forward and rearward axles. Bearing means are mounted between the torque springs and the top of the channel member against which the torque springs bear in the loaded condition. The compensator oscillates independently about its trunnion pivot and equalizes the load distribution among the axles. The torque springs are pivoted to the compensator and flexed against the bearing means, providing the axles with independent axle movement.

The bushing which connects the compensator to the trunnion shaft is above and between the bushings which connect the torque springs to the compensator. Therefore, when the truck brakes are applied, the resulting moments and forces against the compensator are in a downward, rather than an upward, direction and are of sufficient magnitude to eliminate bouncing.

Also, since the connections of the torque beams and the compensator are by resilient bushings, limited lateral swinging of the torque springs can take place when the vehicle makes a turn. The wheels automatically track with the turn, thereby reducing or eliminating skidding, and providing a safer, more certain control of the vehicle.

DESCRIPTION OF THE DRAWINGS

FIG. 1 is a top plan view of the tandem suspension assembly of this invention without the pedestal;

FIG. 2 is a side elevation view of the tandem suspension assembly of FIG. 1 including the lower portion of the pedestal;

FIG. 3 is a view in section taken along the line 3—3 of FIG. 2;

FIG. 4 is a view in section taken along the line 4—4 of FIG. 2;

FIG. 5 is a view in section taken along the line 5—5 of FIG. 1;

FIG. 6 is a view in section taken along the line 6—6 of FIG. 2; and

FIG. 7 is a view similar to FIG. 4 but showing a rear end elevation view of the entire pedestal assembly for mounting the suspension to the vehicle chassis.

A DETAILED DESCRIPTION OF A PREFERRED EMBODIMENT:

The tandem suspension assembly 20 comprises a pedestal 21 fastened at its top by any suitable means such as welding or bolting to a vehicle chassis 23. The pedestal 21 has a suitable bearing surface 24 that enables it to be rigidly secured to the vehicle chassis 23, and has suitable stiffening flanges 25 and 26, and cross braces 27 which extend to an identical pedestal at the other side of the vehicle chassis. At its lower end, the pedestal 21 has a flat lower side 28 against which the upper plate 30 of a cast bracket 31 is mounted. The cast bracket 31 is fastened to the pedestal 21 by a plurality of bolts 34.

The cast bracket 31 has a disk portion 32 and rests upon and is welded to a trunnion shaft 33 that extends the width of the vehicle body. As shown in FIG. 4, the trunnion shaft 33 is hollow and has an internal end plate 35 welded in place.

A bushing assembly 37 is mounted on the trunnion shaft 33 outwardly of the cast bracket 31. The disk portion 32 has an annular recess 39. A trunnion cap 40 is mounted onto the end of the trunnion shaft 33 by a bolt 41 that extends through the trunnion cap 40 and the end plate 35. The section 42 of that bolt 41 that is journaled in the end plate 35 is eccentric relative to the shank of the bolt. The trunnion cap 40 has a radially outwardly extending flange 43 with an annular recess 44. A rubber bushing 45 is mounted on and adhered to the trunnion shaft 33 between the recesses 39 and 44 of the disk portion 32 and end cap 40. A metal sleeve or housing 46 is adhered to and surrounds the rubber bushing 45, and is positioned between the disk portion 32 and the annular flange 43 of the end cap 40, restricting axial movement relative to the trunnion shaft 33.

A compensator 49 comprises an inverted U-shaped channel member having a top 50 and sides 51 and 52. The compensator 49 is mounted on the sleeve 46 with the sleeve 46 extending through openings 53 and 54 in the sides 51 and 52. A spacer bracket 55 is mounted such as by welding between the sides 51 and 52 of the compensator 49 beneath the bushing assembly 37 and includes a bottom plate 56, vertical plate 57, and triangular brace plates 58 and 59 between the bottom plate 56 and vertical plate 57. A reenforcing rib 60 is located on the outer surface near the bottom of each side 51 and 52.

A pair of torque springs 62 and 63, preferably having multiple leaf layers, are pivotally connected to the channel member 49 by bushing assemblies 64 and 65. The axes of the bushing assemblies 64 and 65 are below the axis of the bushing assembly 37, preferably by at least two inches.

As shown in FIG. 6, each bushing assembly 64 and 65 includes a cap screw or bolt 70 having a head 71 and a shank 72 with a cam member 73 welded to the shank 72 and projecting to one side. The cam member 73 acts as an eccentric. An arrow (not shown) is drawn or stamped on the face of the bolt head 71 and points to the central high rise of the cam eccentric 73. The shank 72 of the bolt 70 extends through a hole 77 in a plate 79 positioned within a frame 80. The frame 80 is welded to the side 52 of the compensator 49 and prevents the plate 79 from rotating. The shank 72 extends on through a hole 85 in the side 52, a hole 87 in the side 51 of the compensator 49, and a hole 89 in a plate 91, welded against the side 51. A lock washer 95 and a nut 97 are used to tighten the bolt 70 in place. A metal sleeve 99 surrounds the shank 72 and the cam eccentric 73 of the bolt 70, and a rubber bushing 101 surrounds and is bonded to the sleeve 99. There are washers 103 and 104 at each end of the rubber bushing 101.

Each of the torque springs 62 and 63 comprises a plurality of spring members formed in layers, the torque spring 62 having an upper spring member 110, a middle spring member 111, and a lower spring member 112, and the torque spring 63 having an upper spring member 113, a middle spring member 114, and a lower spring member 115. Although the torque springs are described having three spring members, the number of members would depend on the desired capacity rating. An end 117 of the lower spring member 112 is wound around the rubber bushing 101 of the bushing assembly 64 and an end 119 of the middle spring member 111 is partially wound about the end 117 of the lower spring member 112. Likewise an end 121 of the lower spring member 115 is wound about the rubber bushing 101 of the bushing assembly 65, and an end 123 of the middle spring member 114 is partially wound about the end 121 of the spring member 115. The upper spring members 110 and 113 do not curve around the bushing assemblies 64 and 65 but terminate at a point approximately directly above the bolts 70 of the bushing assemblies 64 and 65. If more spring members are used, they likewise would be progressively shortened.

The torque springs 62 and 63 extend forwardly and rearwardly, respectively, to a pair of axle mount assemblies 130 and 131. As shown in FIGS. 2, 3, and 5, each axle mount assembly 130 and 131 comprises a bracket 133 having an upper concave seat 135 and sides 136 and 137. Bottom plates 139 and 140 are wider than the bracket 133 and include holes 141 near their side edges outside the bracket 133. A support plate 142 resting on the plates 139 and 140 has a pin 143 (FIG. 5) that extends vertically upward within the bracket 133 and through aligned holes in the spring members near the outer ends of each torque spring 62 and 63. The lower end of the pin 143 extends into a recess 144 of the plate 139. The pins 143 hold the spring members of each torque spring in alignment at their outer ends so that any relative movement between the spring members due to flexing of the torque springs 62 and 63 occurs at the ends mounted to the bushings 64 and 65. The front axle 150 of the vehicle is welded in the concave seat 135 of the axle mounting assembly 130, and the rear axle 152 of the vehicle is welded in the concave seat 135 of the axle mounting assembly 131. Each axle mounting assembly 130 and 131 includes a pair of U-bolt and nut assemblies 153 and 154 with the U-bolts extending over the axles and down through the holes 141 in the lower plate 139 to firmly secure the axles to the torque springs.

A front wear plate 155 is mounted between the top 50 near the front of the compensator 49 and the top of the forward torque spring 62. A rear wear plate 156 is mounted between the top 50 near the rear of the compensator 49 and the top of the rearwardly extending torque spring 63. When the suspension assembly 20 is in its loaded condition as shown in FIG. 2, the upper surfaces of the torque springs 62 and 63 rest against the wear plates 155 and 156, respectively.

In place of the wear plates 155 and 156, the sleeve bearings of FIG. 5 of U. S. Pat. application serial No. 866,203, filed Oct. 14, 1969, or other suitable bearing means could be used.

A pair of wear sleeves 160 and 161 are mounted in any suitable manner between the sides 51 and 52 of the compensator 49 with the wear sleeve 160 mounted near the front of the compensator 49 just under and out of contact with the lower surface of the torque spring 62, and the wear sleeve 161 mounted near the rear of the compensator 49 just under and out of contact with the lower surface of the torque spring 63 when the suspension assembly is in its loaded condition. When the suspension assembly is unloaded, that is, when the chassis is lifted such that the wheels are off the ground, the torque springs 62 and 63 drop so as to rest on the wear sleeves 160 and 161, respectively. This condition could also occur where rough road conditions cause the chassis to move upwardly such that the wheels leave the ground.

OPERATION

The suspension assembly 20 is, of course, duplicated on both sides of the truck chassis 23 with the trunnion shaft 33 extending the width of the truck and being common for both suspension assemblies, and with the axles 150 and 152, as well as the chassis 23 being similarly connected to both assemblies.

The functions of the suspension assemblies 20 are to resiliently support varying total loads carried by the vehicle body above the vehicle chassis 23, to respond to uneven distribution of loads either forwardly or rearwardly of the vehicle chassis, compensating for such uneven distribution, and distributing such load substantially equal to both axles 150 and 152, and to react to and dampen individual shock forces applied to either axle 150 or 152 by rough or uneven spots in the roadway.

In addition as has been said, the use of the resilient bushings 64 and 65 permit limited lateral turning of the torque springs 62 and 63 relative to the compensator 49. Also the resilient bushing 37 permits limited lateral turning of the compensator 49 relative to the trunnion shaft 34. As a result, when the vehicle turns a corner, the wheels carried by the axles 150 and 152 can and do track with the turn. This eliminates skidding of the tires on the roadway and gives the driver better control.

Assume first that an uneven distribution of load is carried by the vehicle chassis 23. With an uneven load, there is virtually no tendency of the vehicle chassis 23 to swing downwardly at either its forward or rearward end to rock the pedestal 21 and apply a torsion load to the bushing assembly 37. The applied load is vertical, and the vertical load is transmitted through the pedestal, the trunnion shaft 33, and the bushing assembly 37 into a vertical downward force on the compensator 49. As the compensator 49 moves downwardly under the vertical load, the wear plates 155 and 156 apply pressure to the upper surfaces of the torque springs 62 and 63 and, at the same time, move the bushing assemblies 64 and 65 downwardly. Since the axles 150 and 152 are substantially immovable because they rest upon the immovable roadway, downward movement of the compensator 49 tends to produce clockwise rotation of the torque spring 62 about the bushing assembly 64 and counterclockwise rotation of the torque spring 63 about the bushing assembly 65, as viewed in FIG. 2. This combined action produces upward flexing of the torque springs 62 and 63 at the wear plates 155 and 156 to absorb the variations in the load carried by the truck chassis.

There is a similar action when one of the axles 150 or 152 is bounced upwardly by an unevenness in the roadway. For example, if the axle 150 moves upwardly, it tends to swing the torque spring 62 in a clockwise direction causing it to flex upwardly all the more against the wear plate 155. The wear plate 155 reacts with the force tending to rotate the compensator 49 in a clockwise direction and thereby tending to rotate the pedestal 21 and the vehicle chassis 23 in a clockwise direction. However, as soon as the compensator starts to rotate in a clockwise direction, the wear plate 156 bears all the more against the upper surface of the torque spring 63 causing it to flex upwardly all the more. The resulting increased flexing of the torque spring 63 is in reaction to the increased flexing of the torque spring 62 and tends to equalize the load on the axles 150 and 152 and maintain the vehicle chassis 23 level.

A particular feature of this invention is the use of flexible springs as the torque springs 62 and 63. These flexible springs provide an unusually comfortable ride and act in combination with the compensator, relative arrangement of the bushings 37, 64, and 65, and the other features of the suspension to prevent axle or brake hop and provide equal distribution of the load on the axles, independent axle movement, and excellent stability.

Other features of this invention are the use of eccentric bolts in the bushings 37, 64, and 65. Since the bolt 41 in the bushing 37 that supports the compensator 49 has an eccentric 42, the bolt can be loosened and rotated to balance the compensator. Likewise the eccentric bolts 70 in the bushings 64 and 65 used to mount the torque springs 62 and 63 to the compensator 49 can be loosened and rotated to provide positive axle alignment. For example, in this embodiment the rotation of each bolt 70 moves the axle as much as one-half inch between inward and outward positions. Since each side of the chassis has two eccentric bolts 70, one in each of the bushings 64 and 65, a total one inch adjustment is available on each side.

Various changes and modifications may be made in this invention, as will be readily apparent to those skilled in the art. Such changes and modifcations are within the scope and teaching of this invention as defined by the claims appended hereto.

What is claimed is:

1. A vehicle suspension assembly comprising a pedestal adapted to be suspended from a vehicle chassis between two axles of the vehicle, a compensator, means for connecting the compensator to the pedestal for oscillating movement of the compensator relative to the pedestal about an axis parallel to the axles of the vehicle, a forward flexible torque spring, means for pivotally connecting one end of the forward spring to the compensator, means for connecting the other end of the forward spring to the front one of the two vehicle axles, a rearward flexible torque spring, means for pivotally connecting one end of the rearward spring to the compensator, means for connecting the other end of the rearward spring to the rear one of the two vehicle axles, the torque springs supporting the entire load on the axles, and upper bearing means mounted to the compensator above the upper surface of each torque spring between its axle and pivotal connection means which bears against the top surface of the torque spring when the suspension assembly is under load, the torque springs acting as flexible cantilevers to support the chassis on the axles.

2. The vehicle suspension assembly of claim 1 including lower bearing means mounted in the compensator beneath the lower surfaces of the torque springs such that with the assembly in its unloaded condition, the bottom surfaces of the torque springs rest on the lower bearing means.

3. The vehicle suspension assembly of claim 1 wherein the upper bearing means are wear plates.

4. The vehicle suspension assembly of claim 1 wherein the upper bearing means are bearing sleeves.

5. The vehicle suspension assembly of claim 1 wherein the connecting means between the compensator and the pedestal comprises a rotary eccentric for changing the oscillatory axis of the compensator relative to the pedestal.

6. The vehicle suspension assembly of claim 1 wherein the flexible torque springs are multilayered leaf springs.

7. The vehicle suspension assembly of claim 1 wherein the connecting means between the forward torque spring and the compensator and the connecting means between the rearward torque spring and the compensator comprise rotary eccentrics for changing the pivotal axes of the forward and rearward torque springs relative to the compensator to provide means for aligning the axles.

8. The vehicle suspension assembly of claim 1 wherein the connecting means between the forward torque spring and the compensator and the connecting means between the rearward torque spring and the compensator comprise rubber bushing means, the rear end of the forward torque spring being journaled about its connecting bushing and the forward end of the rearward torque spring being journaled about its connecting bushing.

9. The vehicle suspension assembly of claim 1 wherein the pivotal connections of the flexible torque springs are below the connecting means between the compensator and the pedestal.

* * * * *